United States Patent
Harris

(10) Patent No.: US 12,208,536 B2
(45) Date of Patent: Jan. 28, 2025

(54) PEELABLE PROTECTIVE COVER

(71) Applicant: David W. Harris, Boerne, TX (US)

(72) Inventor: David W. Harris, Boerne, TX (US)

( * ) Notice: Subject to any disclaimer, the term of this patent is extended or adjusted under 35 U.S.C. 154(b) by 503 days.

(21) Appl. No.: 17/573,863

(22) Filed: Jan. 12, 2022

(65) Prior Publication Data
US 2023/0219254 A1    Jul. 13, 2023

(51) Int. Cl.
| | |
|---|---|
| *B28B 11/24* | (2006.01) |
| *B05D 3/00* | (2006.01) |
| *B05D 3/10* | (2006.01) |
| *B05D 5/00* | (2006.01) |
| *B29C 59/02* | (2006.01) |
| *E04C 5/07* | (2006.01) |

(52) U.S. Cl.
CPC ............ *B28B 11/245* (2013.01); *B05D 3/007* (2013.01); *B05D 3/108* (2013.01); *B05D 5/00* (2013.01); *B29C 59/026* (2013.01); *E04C 5/073* (2013.01)

(58) Field of Classification Search
None
See application file for complete search history.

(56) References Cited

U.S. PATENT DOCUMENTS

2014/0234563 A1*  8/2014  Bone .................. B32B 38/00
                                                    442/151

* cited by examiner

*Primary Examiner* — Shawn Mckinnon
(74) *Attorney, Agent, or Firm* — Olson & Cepuritis, Ltd.

(57) ABSTRACT

A peelable protective composite for flooring is made of an open mesh fabric embedded in a polymeric film having a tensile strength of at least 5 megapascals, an elongation of more than 1,000 percent, and adhesive strength of no more than about one megapascal. The protective composite can also be used to enhance curing of freshly poured concrete.

10 Claims, 1 Drawing Sheet

PEELABLE PROTECTIVE COVER

FIELD OF INVENTION

This invention relates to peelable protective cover compositions for flooring.

BACKGROUND OF INVENTION

A need exists to protect non-porous surfaces, such as flooring, from damage caused by weathering, abrasion, staining, scratching, and the like by a temporary, peelable cover which can be subsequently easily removed from the non-porous surface without damaging the surface. The present peelable protective cover satisfies that need.

SUMMARY OF INVENTION

An adherent but peelable protective composite is formed over a flooring surface and the like in need of temporary protection during construction, moving of heavy equipment, and similar operations. The protective composite has a relatively high tensile strength, resists abrasion, and comprises a film removably attachable to flooring and having an open mesh fabric embedded therein. The present peelable protective composite is also useful for enhanced curing of freshly poured concrete.

The peelable protective composite is formed by first placing a liquid permeable, open mesh fabric web contiguous with the flooring surface, such as a concrete slab, thereafter applying to the open mesh fabric web a water-based, film forming liquid containing dispersed, polymerizable solids in an amount sufficient to pass through the web, wet the flooring surface, surround the web, and form a liquid layer, preferably having a thickness of at least 250 microns. Thereafter the liquid layer is solidified by drying so as to polymerize the dispersed solids and to produce a removable composite having the open mesh fabric embedded in a film. The film preferably has a thickness of at least about 100 microns, a tensile strength of at least 5 megapascals (MPa), an elongation of more than 1,000 percent, and an adhesive strength of no more than about one megapascal (MPa).

The water-based, film forming liquid is a water dispersion of polymerizable resins having a solids content of at least 30 percent by weight, preferably in the range of about 30 to about 60 percent by weight.

DESCRIPTION OF PREFERRED EMBODIMENTS

Figure 1:
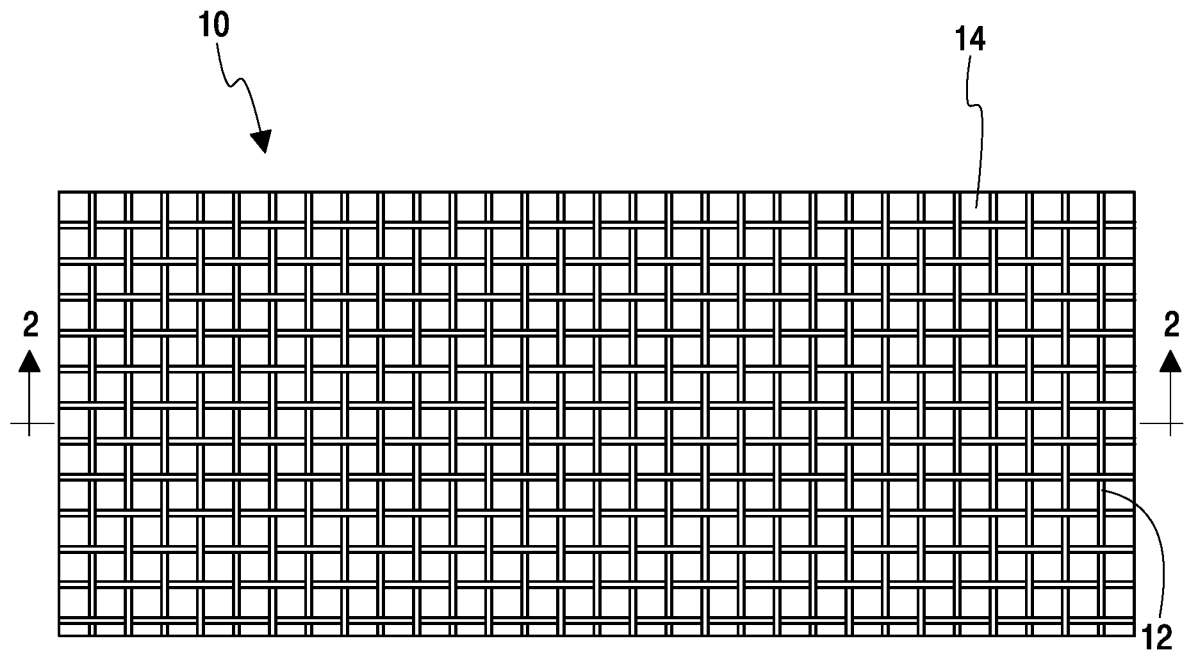
FIG. 1 is a plan view of a portion of the protective composite applied to a concrete flooring.
Figure 2:
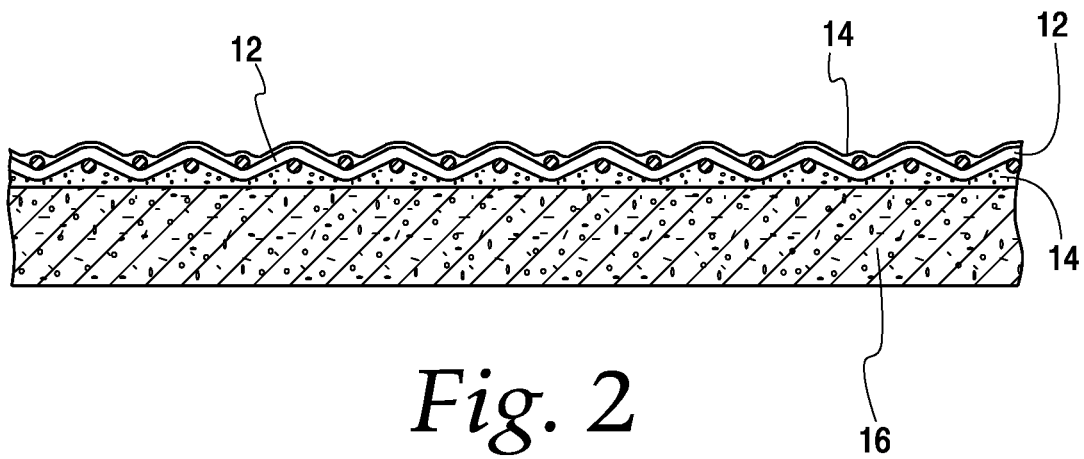
FIG. 2 is an enlarged sectional view taken along plane 2-2 shown in FIG. 1.

Referring to the drawings, FIG. 1 shows a peelable protective composite 10 which is an open mesh fabric web 12 embedded in a film 14 that is releasable when attached to a solid, non-porous surface such as concrete 16, as shown in FIG. 2.

The fabric web suitable for practicing the present invention is an open mesh fabric permeable to a water-based, film-forming liquid that forms a peelable film by direct emulsion polymerization. Illustrative are 4- to 12-ounce per square yard open mesh fabrics such as vinyl coated polyester fabrics, fiberglass fabrics, and the like. Preferred open mesh fabrics are fiberglass plain weave fabric and vinyl coated polyester fabric commercially available from Phifer Incorporated, Tuscaloosa, AL.

Typical specifications for the preferred open mesh fabrics are set forth below.

| | PRODUCT: FIBERGLASS 18 × 14 13 MIL YARN, PLAIN WEAVE | | | |
|---|---|---|---|---|
| | | | NOMINAL RESULTS | |
| | | REFERENCE | | |
| | CHARACTERISTIC | TEST METHOD | WARP | FILL |
| 1) | TENSILE STRENGTH | | | |
| | A) CUT STRIP METHOD (lb) | ASTM D 5035 | 159 | 123 |
| | B) GRAB METHOD (lb) | ASTM D 5034 | 162 | 125 |
| 2) | TEARING STRENGTH | | | |
| | TRAPEZOID METHOD (lb) | ASTM D 5587 | 18 | 15 |
| 3) | STIFFNESS (mg) | ASTM D 3656 | 126 | 95 |
| 4) | MESH WEIGHT (oz/sq yd) | ASTM D 3776 | 4.6 | |
| 5) | FABRIC THICKNESS (inch) | ASTM D 1777 | 0.015 | |
| 6) | BOND STRENGTH (lb) | CS 248-64(5.5) | 36 | |
| 7) | TRANSMITTANCE (%) | I7 | 55.3 | |
| 8) | COLORFASTNESS TO 1200 HRS | | | |
| | Color Change According to AATCC Gray Scale | ASTM G154 | All Colors 4 min | |
| 9) | MULLEN BURSTING STRENGTH(psi) A) Initial | FS L-S-125B(4.4.7) | 198 | |

| | PRODUCT: VINYL COATED POLYESTER, 17 × 13, .018/.018 | | | |
|---|---|---|---|---|
| | | | NOMINAL RESULTS | |
| | | REFERENCE | | |
| | CHARACTERISTIC | TEST METHOD | WARP | FILL |
| 1) | TENSILE STRENGTH | | | |
| | A) CUT STRIP METHOD (lb) | ASTM D 5035 | 137 | 112 |
| | B) GRAB METHOD (lb) | ASTM D 5034 | 170 | 142 |

-continued

PRODUCT: VINYL COATED POLYESTER, 17 × 13, .018/.018

| | CHARACTERISTIC | REFERENCE TEST METHOD | NOMINAL RESULTS WARP | FILL |
|---|---|---|---|---|
| 2) | TEARING STRENGTH TRAPEZOID METHOD (lb) | ASTM D 5587 | 31 | 26 |
| 3) | STIFFNESS (mg) | ASTM D3656 | 252 | 168 |
| 4) | STRETCH (%) | TMS-TM-002 | 1.7 | 2.6 |
| | SET (%) | TMS-TM-002 | 0.2 | 0.3 |
| 5) | MESH WEIGHT (oz/sq yd) | ASTM D 3776 | 6.8 | |
| 6) | FABRIC THICKNESS (inch) | ASTM D 1777 | 0.024 | |
| 7) | BOND STRENGTH (lb) | CS 248-64(5.5) | 44 | |
| 8) | OPENNESS/TRANSMITTANCE (%) | I7 | 45.7 | |
| 9) | BLOCKING | FS L-S-125B(4.4.9) | Scale 1 | |

The water-based, film-forming liquid suitable for practicing the present invention is a polymerizable resin dispersion in water. The polymerizable resins can be polyacrylic, polyurethane, vinyl acetate, vinyl alcohol, styrene-butadiene latex, and the like. Mixtures of the foregoing resins can be utilized as well.

Viscosity of the water-based polymerizable resin dispersions is in the range of about 16,000 to about 20,000 centipoise (cP) at 20 degrees C. The water based polymerizable resin dispersions have a solids content of at least about 30 percent by weight, preferably in the range of about 30 percent to about 60 percent by weight, more preferably about 40 percent to about 55 percent by weight.

A peelable protective composite is formed on a flooring surface by first placing the liquid permeable, open mesh fabric on the surface to be protected and contiguous therewith. The water-based, film-forming liquid thereafter is applied to the web by pouring and spreading in any convenient manner in an amount sufficient to wet the flooring surface, surround the web, and form a wet liquid layer that encompasses the open mesh fabric and forms a liquid layer, preferably having a thickness of at least 250 microns, more preferably about 250 to about 500 microns, which is then solidified by air drying to induce direct emulsion polymerization and to form a film which surrounds the open mesh web and releasably adheres to the flooring surface.

The protective covering produced in the aforedescribed manner has the open mesh fabric embedded in a film having thickness of at least 100 microns, a tensile strength of at least five megapascals (MPa), an elongation of more than 1,000 percent, and an adhesive strength of no more than about one megapascal (MPa).

EXAMPLE

A peelable protective composite is formed on a concrete floor by first placing on the concrete floor a 4.8 ounce/sq. yard plain weave open mesh fiberglass fabric. A film forming dispersion of a polymerizable resin in water (about 45 weight percent of solids; pH 7-8; viscosity 18,000±2,000 cP @ 20° C.) is then spread over the open mesh fabric to form a liquid layer about 250 microns thick.

The formed liquid layer together with the open mesh fabric is then exposed to ambient air and dried to induce polymerization of the resin and to produce a dry film about 100 microns thick and having the open mesh fabric embedded therein.

The dry protective composite obtained in the foregoing manner is manually peeled from the concrete floor. Surface of the composite that was in contact with the concrete floor is defined primarily by the dry film.

The peelable protective composite embodying the invention can also be utilized to enhance and promote curing of freshly poured concrete.

It is well known that during an initial time period after concrete is poured it is necessary to maintain proper temperature and dampness to insure proper curing of the concrete. An uncured, or improperly cured slab of concrete is likely to develop crazing (fine cracks) and the slab surface is likely to have low strength and low resistance to abrasion. It has been found that such problems can be ameliorated by the application of the peelable protective composite after a freshly poured concrete has been sufficiently set for surface grinding and polishing, usually about ten days after pouring.

In a typical application the following events take place:

Day 1—concrete slab is poured

Days 2 to 10—poured concrete is permitted to cure in a conventional manner, e.g., by wet cure, blanket cure, chemical cure, and the like Day 10—the poured concrete is sufficiently solidified, and is subjected to surface grinding and polishing Day 10+—the present peelable composition is applied to the polished concrete surface and is kept in place for at least ten days, preferably for 15 to 18 days The description above and the drawings are illustrative of the present invention and are not to be construed as limiting. Still other variants within the spirit and scope of the claimed invention are possible and will readily present themselves to those skilled in the art.

The invention claimed is:

1. A method for applying an adherent but peelable protective composite on a flooring surface which comprises the steps of placing a liquid permeable, open mesh fabric contiguous with the flooring surface;

thereafter applying to said fabric a water-based, film-forming liquid in an amount sufficient to pass through the fabric, wet the flooring surface, surround the fabric, and form a liquid layer having a thickness of at least 250 microns in contact with the flooring surface; and solidifying the liquid layer by drying to form a film;

wherein the film-forming liquid is a polymerizable resin dispersion in water having a viscosity in the range of about 16,000 cP to about 20,000 cP at 20 degrees C. and a solids content in the range of about 40 to about 55 percent by weight.

2. The method in accordance with claim 1 wherein the open mesh fabric is a vinyl coated polyester fabric.

3. The method in accordance with claim 1 wherein the open mesh fabric is a fiberglass fabric.

4. A peelable protective composite comprising an open mesh fabric embedded in a polymeric film having a thickness of at least 100 microns and a tensile strength of at least 5 megapascals.

5. The composite in accordance with claim 4 wherein the open mesh fabric is a fiberglass plain weave.

6. The composite in accordance with claim 4 wherein the open mesh fabric is a vinyl coated polyester.

7. A method for enhanced curing of a poured concrete slab which comprises the steps of
polishing the concrete slab to provide a polished surface on the concrete slab, and
thereafter applying to the polished surface a peelable protective composite of claim 4.

8. A method for enhanced curing of a concrete slab having a polished surface which comprises the steps of
placing a liquid permeable, open mesh fabric on the polished surface;
thereafter applying to said fabric a water-based, film-forming liquid in an amount sufficient to pass through the fabric, wet the polished surface, surround the fabric, and form a liquid layer having a thickness of at least 250 microns in contact with the polished surface; and
solidifying the liquid layer by drying to form a film;
wherein the film-forming liquid is a polymerizable resin dispersion in water having a viscosity in the range of about 16,000 cP to about 20,000 cP at 20 degrees C. and a solids content in the range of about 40 to about 55 percent by weight.

9. The method in accordance with claim 8 wherein the open mesh fabric is a vinyl coated polyester fabric.

10. The method in accordance with claim 8 wherein the open mesh fabric is a fiberglass fabric.

* * * * *